Patented Sept. 6, 1932

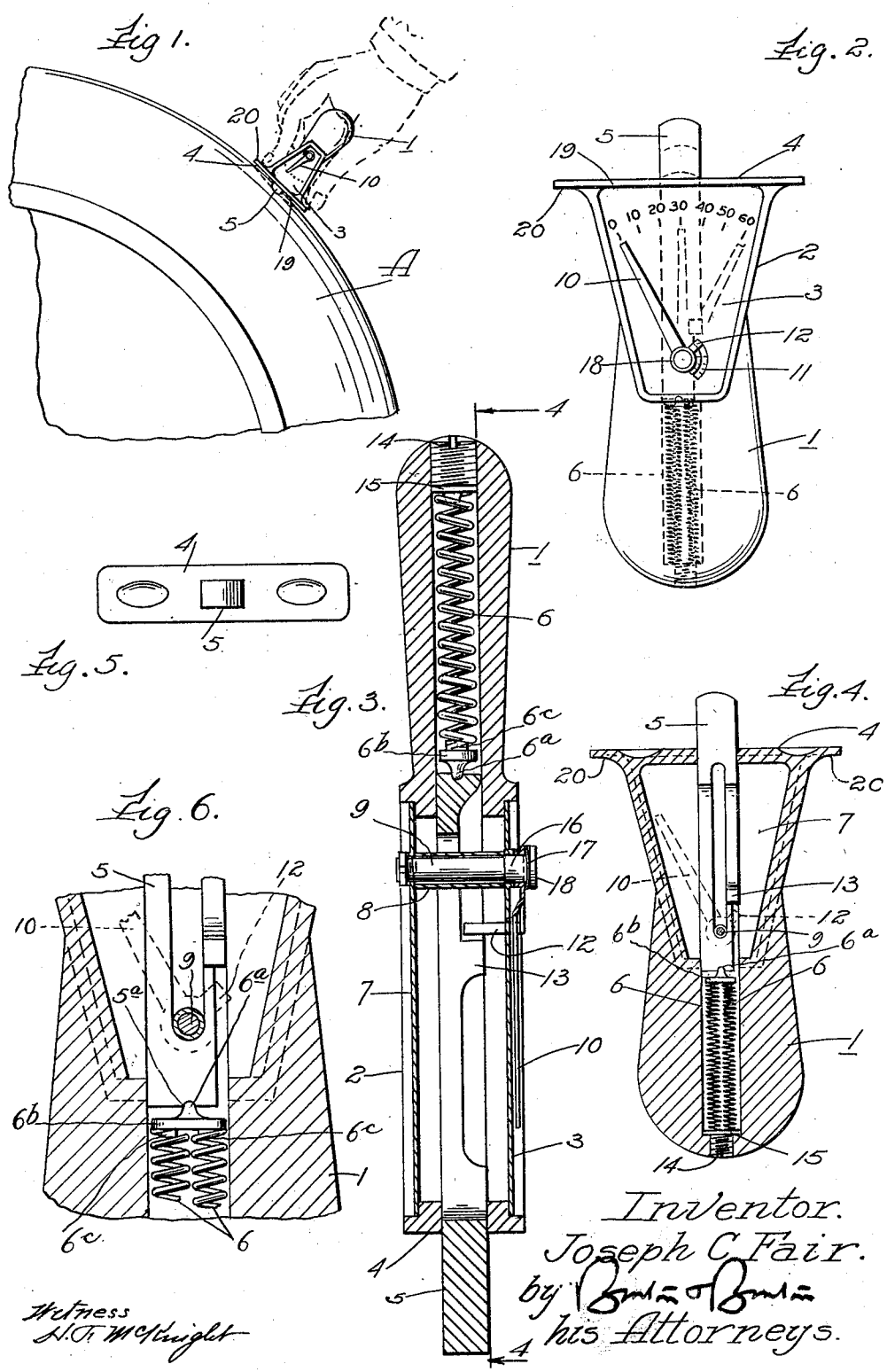

1,875,862

UNITED STATES PATENT OFFICE

JOSEPH C. FAIR, OF FORT WAYNE, INDIANA

TIRE PRESSURE GAUGE

Application filed July 7, 1930. Serial No. 465,865.

The purpose of this invention is to provide a relatively simple portable gauge device adapted for determining the degree of inflation of a pneumatic tire or the like, and particularly arranged for making such determination without access to the interior of the tire. It consists of certain features and elements of construction in combination, as herein shown and described and as indicated by the claim.

In the drawing:

Figure 1 is a partial side elevation of a vehicle tire and of the gauge device embodying this invention, showing the method of using the latter.

Figure 2 is a side elevation of the gauge on a larger scale and showing it inverted as compared with the position of use illustrated in Figure 1.

Figure 3 is a transverse vertical section on an enlarged scale.

Figure 4 is a section taken as indicated at line 4—4 on Figure 3, drawn substantially to the same scale as Figure 2.

Figure 5 is an end view of the device.

Figure 6 is an enlarged fragmentary view showing the equalizer for the springs.

As shown, the device embodying this invention includes a body or housing having a handle portion, 1, and preferably integral therewith a frame portion, 2, which supports a dial plate, 3, and terminates in a stop shoulder, 4. Slidably mounted in the frame and handle is a plunger, 5, normally protruding past the plane of the stop shoulder, 4, and yieldingly held in that position by compression springs, 6, 6, pocketed in the handle, 1. In addition to the dial plate, 3, the frame, 2, supports a back plate, 7, said plates being formed to be lodged in suitable recesses of the frame in spaced relation to each other with the plunger, 5, extending between them.

A spacer sleeve, 8, extending between the plates, 3 and 7, accommodates a bolt, 9, which serves as a pivot for an indicating needle or hand, 10, mounted adjacent the dial plate, 3, at the outer side thereof for swinging about such pivot to traverse the graduations marked on the face of the dial plate, 3. The dial plate has an arcuate slot, 11, through which a bent lug, 12, of the needle member, 10, projects for engagement by a lug, 13, formed on the plunger, 5.

The lower end of the plunger, 5, is provided with a centrally located curved socket, 5$^a$, in which is seated the rounded nose, 6$^a$, of an equalizer block, 6$^b$, disposed below said plunger, as seen in Figure 6. Said block is provided with a pair of spaced bosses, 6$^a$, adapted to engage in the ends of the springs, 66, for maintaining them in a definite position. Thus the block is free to rock about its "ball-and-socket" mounting to accommodate the differences in pressure of said springs.

For determining the pressure to which a tire such as that indicated at A in Figure 1, has been inflated, the gauge device is applied as shown with the end of the plunger, 5, in contact with the surface of the tire, and with the whole device pressed toward the tire until the stop shoulder, 4, also engages its surface. It will be seen that if the tire were absolutely rigid the plunger, 5, would thus be depressed inwardly to bring its outer end flush with the shoulder, 4, but the yielding nature of the tire permits the plunger, 5, to protrude past the plane of the shoulder, 4, to an extent depending upon the pressure of the air in the tire. In other words, the air pressure in the tire is balanced against the compression springs, 6, 6, which oppose it through the plunger, 5. Inward movement of the plunger, 5, from the normal position shown in Figure 2 causes this lug, 13, to engage the lug, 12, of the needle, 10, and swing the needle about its pivot through an angle corresponding to the depression of the plunger, 5. The graduations on the dial plate, 3, may be marked in terms of pounds pressure per square inch corresponding to the various angular positions which the needle, 10, may assume, and thus the device will indicate the pressure of the air in the tire.

Preferably the arcuate travel of the lug, 12, is so arranged that the radial arm of the lug, 12, with respect to its pivot is nearly perpendicular to the direction of movement of the plunger, 5, through most of the range so that the angular movement of the needle, 10, will be very nearly directly proportional to the straight-line movement of the plunger, 5. In so far as this is not strictly true, the dial may be graduated accordingly, but in general the units of graduation will be about equal throughout the scale.

For calibrating the device or readjusting for any change in tension of the springs, 6, 6, there is provided an adjusting screw, 14, in the outer end of the handle, 1, which may impinge against a pressure plate, 15, serving as a seat for the outer ends of the springs, 6, 6.

It will be seen that whereas other gauges heretofore have been designed to measure directly the pressure of the air within the tire and were therefore required to be connected to the interior of the tire by removal of the usual filler cap and application to the valved stem of the tire, the present device is much simpler to use since it provides for instantaneous indication of the condition of the air pressure merely upon being pressed against the body of the tire. It will thus result in a great saving of time to the user, and because of the extreme simplicity of its use will encourage an inspection of tire pressures to be made more frequently and the air pressure to be kept nearer a proper value for securing the best riding qualities and longest life from the tires.

Preferably, the needle, 12, while rotatably mounted upon the enlarged portion, 16, of the bolt, 9, is provided with frictional resistance against such rotation in the form of a spring washer, 17, placed under the head, 18, of the bolt, and in contact with the hub portion of the needle, 10. As a result, the needle will remain at the maximum indicating position to which it is moved by the inward depression of the plunger, 5, when the device is applied to the tire, while the plunger itself will return to normal position as soon as the gauge is removed from the tire. This makes the gauge a recording instrument which may be read at leisure after its removal from the tire instead of requiring the user to attempt to read the scale with the device in position shown in Figure 1.

In the form of the device illustrated the stop shoulder, 4, constitutes one surface of a flange, 19, and this flange projects laterally at 20 from two sides of the frame portion, 2, so as to provide surfaces against which the fingers may apply pressure to the device in forcing it against the surface of the tire, as illustrated in Figure 1. This method of holding and applying the gauge is not essential but will usually be found the most convenient.

I claim:

A gauge comprising a body having an external stop shoulder, a plunger movably carried in the body and projecting normally past said shoulder with spring means pocketed in the body yieldingly holding said plunger in projecting position, but adapted to permit its depression toward said shoulder, said spring means including a pair of coil springs disposed side by side, an equalizer block pivotally associated with the plunger and engaging said springs respectively at opposite sides of its pivot, whereby it is adapted to rock on the pivot for accommodating differences in said springs; and pressure-indicating means movably engaged with said plunger.

JOSEPH C. FAIR.